US009495937B2

(12) United States Patent
Yang et al.

(10) Patent No.: US 9,495,937 B2
(45) Date of Patent: Nov. 15, 2016

(54) COLOR DETECTION SYSTEM FOR DISPLAY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Fu-Yun Yang, Wuhan (CN); Xiang-Ming Li, Wuhan (CN); Pei Tu, Wuhan (CN); Ping Tian, Wuhan (CN)

(73) Assignees: HONG FU JIN PRECISION (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 294 days.

(21) Appl. No.: 14/447,886

(22) Filed: Jul. 31, 2014

(65) Prior Publication Data

US 2015/0036140 A1 Feb. 5, 2015

(30) Foreign Application Priority Data

Aug. 1, 2013 (CN) .......................... 2013 1 0333270

(51) Int. Cl.
*G01J 3/46* (2006.01)
*G01B 11/14* (2006.01)
*G09G 5/02* (2006.01)

(52) U.S. Cl.
CPC .......... *G09G 5/02* (2013.01); *G09G 2360/145* (2013.01)

(58) Field of Classification Search
CPC .......... G01J 3/0291; G01J 3/021; G01J 3/10; G01J 3/18; G01J 3/2803; G01J 3/42; G01J 3/0208; G01J 3/0216; G01J 3/027; G01J 3/50; G01J 3/506; G01B 11/026; G01B 11/0608; G01B 11/14; G01B 2210/50; G09G 5/02; G09G 2360/145
USPC .................................................. 356/402, 614
See application file for complete search history.

(56) References Cited

U.S. PATENT DOCUMENTS

2003/0158495 A1* 8/2003 Hogan ............... A61B 5/04009 600/545
2012/0033085 A1* 2/2012 Bayramoglu ........... G01J 3/506 348/177
2013/0100154 A1* 4/2013 Woodings ............ G06T 11/206 345/589

* cited by examiner

*Primary Examiner* — Tarifur Chowdhury
*Assistant Examiner* — Sunghee Y Gray
(74) *Attorney, Agent, or Firm* — Zhigang Ma

(57) ABSTRACT

A color detection system includes a motherboard, a detection device, and a detection card. The detection device comprises a display unit and a memory unit storing a first color frequency setting value. The display unit displays a first color according to the color frequency setting value. The detection card includes a color sensor, a microcontroller, and a first connector. The color sensor generates a first color frequency current value after sensing the first color from the display unit and sends the first color frequency current value to the microcontroller. The microcontroller sends the first color frequency current value to the motherboard And the motherboard outputs detection success information to the display unit when a first difference value between the first color frequency current value and the first color frequency setting value is less than a predetermined value. The display unit displays the detection success information.

20 Claims, 3 Drawing Sheets

COLOR DETECTION SYSTEM FOR DISPLAY

FIELD

The present disclosure relates to testing systems in an electronic device, and particularly to a color detection system for a display.

BACKGROUND

Usually, a display is mounted in an electronic device. A color detection system is used to detect colors of the display.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

Figure 1:
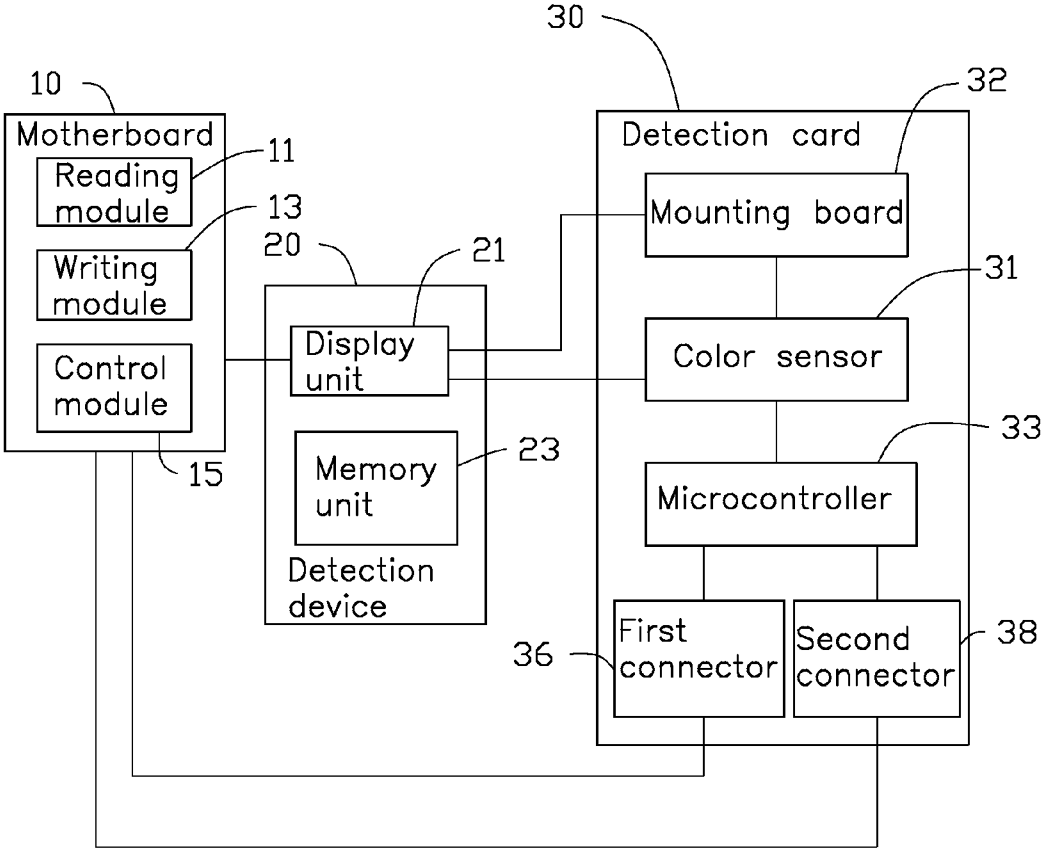
FIG. 1 is a block diagram of one embodiment of a color detection system.

FIG. 1 illustrates one embodiment of a color detection system comprising a motherboard 10, a detection device 20 connected to the motherboard 10, and a detection card 30 connected to the detection device 20.

The detection device 20 comprises a display unit 21 and a memory unit 23. The memory unit 23 is configured to store a plurality of color frequency setting values. Each color frequency setting value corresponds to a predetermined color. The display unit 21 is configured to display each color according to each color frequency setting value. In one embodiment, the display unit 21 is substantially planar; there are three color frequency setting values corresponding to three colors which are red, green, and blue.

The motherboard 10 comprises a reading module 11, a writing module 13, and a control module 15.

Figure 2:
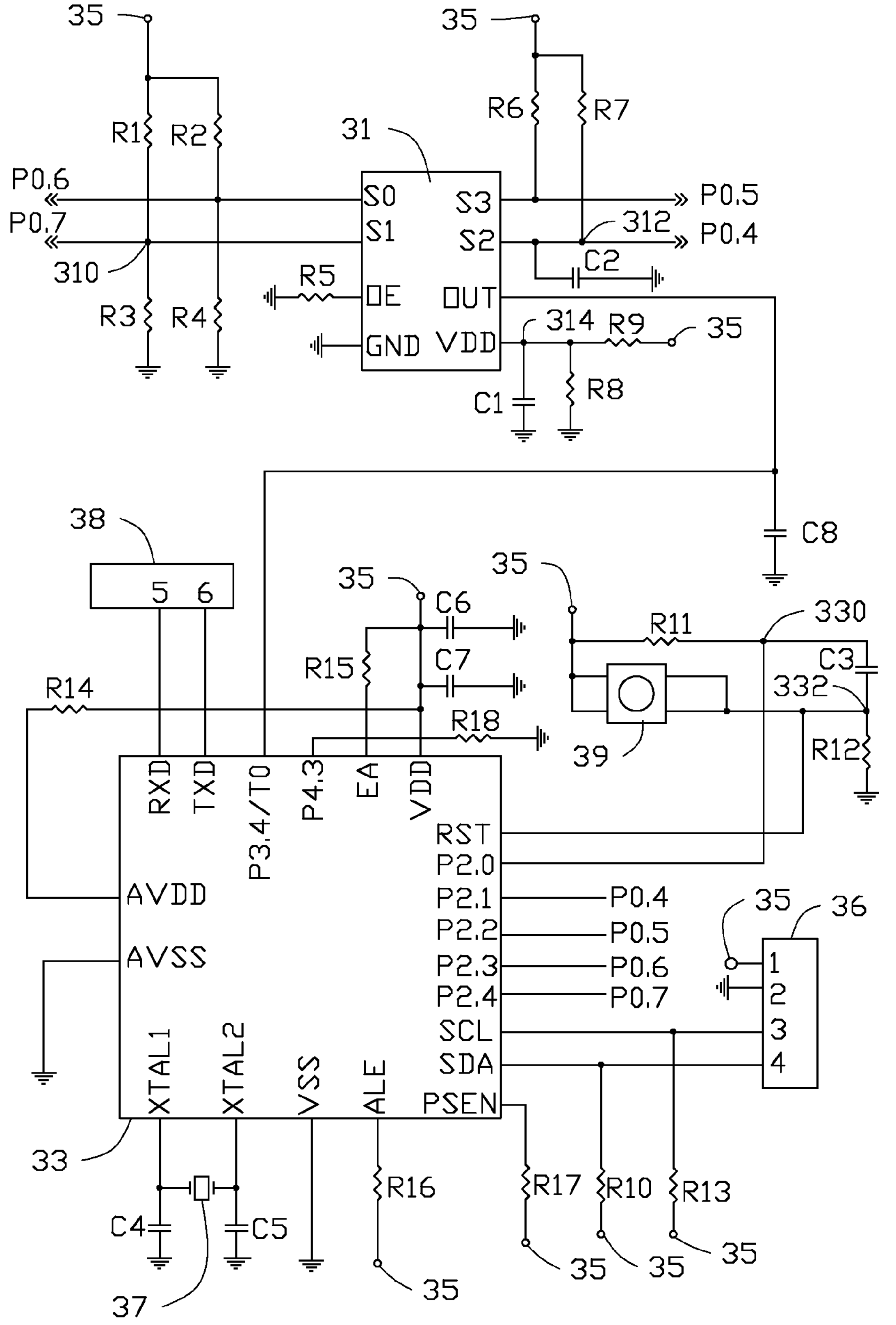
FIG. 2 is a circuit diagram of a detection card of FIG. 1.
Figure 3:
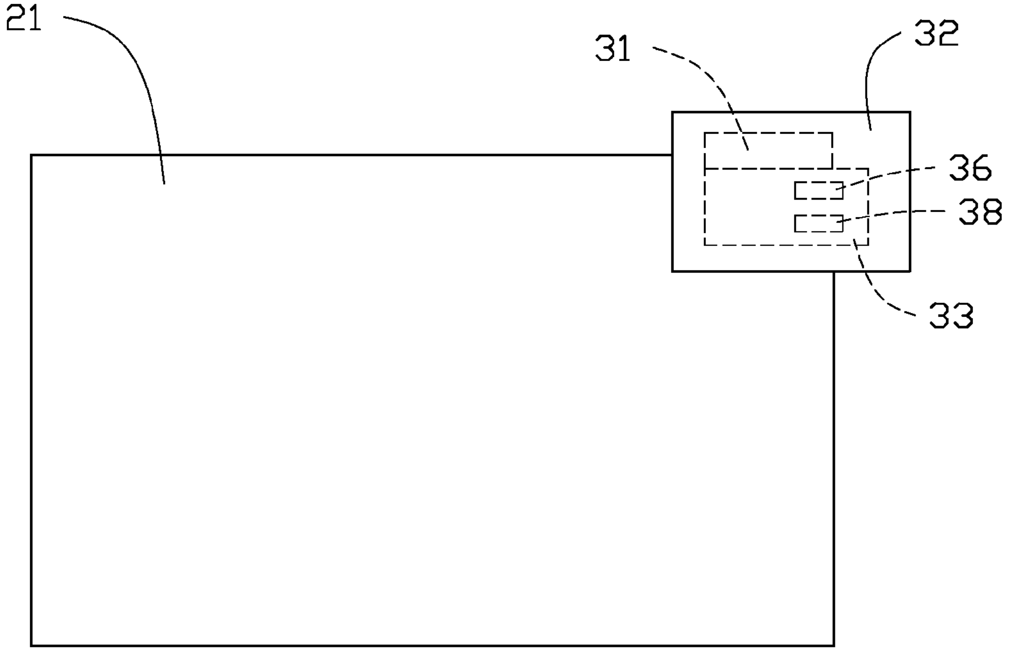
FIG. 3 is a block view of the detection card mounted on the display unit of FIG. 1.

FIGS. 2 and 3 illustrate that the detection card 30 comprises a color sensor 31, a mounting board 32 mounted on the display unit 21, a microcontroller 33 connected to the mounting board 32, a first connector 36 connected to the microcontroller 33, and a second connector 38 connected to the microcontroller 33. The second connector 38 is configured to be connected to the motherboard 10. The color sensor 31 is mounted between the microcontroller 33 and the display unit 21. The mounting board 32 is a plane and is substantially parallel to the display unit 21. The microcontroller 33 is mounted on the mounting board 32 and is positioned between the mounting board 32 and the color sensor 31. The microcontroller 33 stores a predetermined value. In one embodiment, the color sensor 31 is TCS3210D, the microcontroller 33 is W79E227, and the microcontroller 33 is capable of receiving frequency values from 20 MHz to 40 MHz. The color sensor 31 comprises a first pin S0, a second pin S1, a third pin S2, and a fourth pin S3.

The first pin S0 of the color sensor 31 is connected to a power supply 35 via a second resistor R2 and is grounded via a fourth resistor R4. The second pin S1 of the color sensor 31 is connected to a first node 310. The first node 310 is coupled to the power supply 35 via a first resistor R1 and is grounded via a third resistor R3. The third pin S2 of the color sensor 31 is connected to a second node 312. The second node 312 is grounded via a second capacitor C2 and is coupled to the power supply 35 via a seventh resistor R7. The fourth pin S3 of the color sensor 31 is coupled to the power supply 35 via a sixth resistor R6. An output enable pin OE of the color sensor 31 is grounded via a fifth resistor R5. The ground pin GND of the color sensor 31 is grounded. A power supply pin VDD of the color sensor 31 is connected to a third node 314. The third node 314 is grounded via a first capacitor C1 and an eighth resistor R8. The third node 314 is further coupled to the power supply 35 via a ninth resistor R9. A frequency output pin OUT of the color sensor 31 is grounded via an eighth capacitor C8. In one embodiment, the power supply 35 is configured to provide 5V voltage.

The microcontroller 33 comprises a first two-way terminal P2.0, a second two-way terminal P2.1, a third two-way terminal P2.2, a fourth two-way terminal P2.3, a fifth two-way terminal P2.4, a sixth two-way terminal P4.3, a time counter input terminal P3.4/T0, an analog ground terminal AVSS, a power supply ground terminal VSS, a power supply positive pole terminal VDD, an analog voltage terminal AVDD, a system resetting terminal RST, a first transmission terminal SDA, a second transmission terminal SCL, a process storing allowable terminal PSEN, an outer process storing allowable terminal EA, an address locking allowable signal terminal ALE, a crystalloid output or outer clock input terminal XTAL1, a crystalloid output terminal XTAL2. In one embodiment, the time counter input terminal P3.4/T0 of the microcontroller 33 corresponds to the time counter input terminal P3.4/T0 of the microcontroller 33, the first transmission terminal SDA of the microcontroller 33 corresponds to the I2C protocol data terminal SDA, the second transmission terminal SCL of the microcontroller 33 corresponds to the I2C protocol clock terminal SCL.

The first two-way terminal P2.0 of the microcontroller 33 is connected to a fourth node 330. The fourth node 330 is coupled to the power supply 35 via an eleventh resistor R11 and is coupled to a fifth node 332 via a third capacitor C3. The fifth node 332 is coupled to the power supply 35 via a switch 39 and is grounded via a twelfth resistor R12. The second two-way terminal P2.1 of the microcontroller 33 is connected to the second node 312. The fourth two-way terminal P2.3 of the microcontroller 33 is connected to the first pin S0 of the color sensor 31. The time counter input terminal P3.4/T0 of the microcontroller 33 is connected to the frequency output pin OUT of the color sensor 31. The analog ground terminal AVSS and the power supply ground terminal VSS of the microcontroller 33 are grounded. The sixth two-way terminal P4.3 of the microcontroller 33 is grounded via an eighteenth resistor R18.

The analog voltage terminal AVDD of the microcontroller 33 is connected to the power supply positive pole terminal VDD of the microcontroller 33 via a fourteenth resistor R14. The power supply positive pole terminal VDD of the microcontroller 33 is connected to the power supply 35, is grounded via a seventh capacitor C6, is grounded via a seventh capacitor C7, and is coupled to the outer process storing allowable terminal EA of the microcontroller 33 via a fifteenth resistor R15. A crystalloid 37 is coupled between the crystalloid output or outer clock input terminal XTAL1 and the crystalloid output terminal XTAL2 of the microcontroller 33. The crystalloid output or outer clock input terminal XTAL1 of the microcontroller 33 is grounded via a fourth capacitor C4. The crystalloid output terminal XTAL2 of the microcontroller 33 is grounded via a fifth capacitor C5. The crystalloid 37 is configured to generate a clock frequency. The address locking allowable signal terminal ALE of the microcontroller 33 is coupled to the power supply 35 via a sixteenth resistor R16. The process storing allowable terminal PSEN of the microcontroller 33 is coupled to the power supply 35 via an eleventh resistor R17 and via a thirteenth resistor R13. The first transmission terminal SDA of the microcontroller 33 is coupled to the power supply 35 via a tenth resistor R10 and is connected to a data input/output pin 4 of the first connector 36. The second transmission terminal SCL of the microcontroller 33 is connected to the clock signal pin 3 of the first connector 36. The process storing allowable terminal PSEN of the microcontroller 33 is connected to the clock signal pin 3 of the first connector 36. A power supply pin 1 of the first connector 36 is connected to the power supply 35. A ground pin 2 of the first connector 36 is grounded. The first connector 36 is connected to the motherboard 10.

A serial communication input terminal RXD of the microcontroller 33 is connected to a input pin 5 of the second connector 38. A serial communication output terminal TXD of the microcontroller 33 is connected to an output pin 6 of the second connector 38. In one embodiment, resistances of the resistors R1-R8 and R11-R12 are 8.2 KΩ, resistances of the resistors R9 and R14 are 330 Ω, resistances of the resistors R10 and R13 are 4.7 Ω, resistances of the resistors R15-R17 are 8.2 KΩ, a resistance of the resistor R18 is 1K Ω, and capacitor values of the capacitor sC1-C8 are 0.01 μF, 0.04 μF, 10 μF, 10 pF, 10 pF, 10 μF, 0.01 μF, and 0.1 μF respectively.

A principle of the color detection system is shown as follows. When the color of the motherboard 10 needs to be detected, the detection card 30 is hermetically sealed and is stuck to the display unit 21 of the display device 20. Then, the first connector 36 is switched on. The control module 15 of the motherboard 10 controls the display unit 21 to display each color corresponding to each color frequency setting value after the reading module 11 has read each color frequency setting value storing in the storing unit 23. The color sensor 31 generates a color frequency current value after feeling each color shown in the display unit 21, and sends the color frequency current value to the microcontroller 33. The microcontroller 33 generates a difference value corresponding to each color frequency setting value and each color frequency current value after receiving each color frequency current value. The reading module 11 sends each difference value and a predetermined value stored in the microcontroller 33 to the control module 15 after reading the difference value and the predetermined value. The control module 15 controls the writing module 13 to output detection success information to the display unit 21 and output a detection success file to the storing unit 23 when each difference value is less than the predetermined value. Furthermore, the control module 15 controls the writing module 13 to output detection failure information to the display unit 21 and output a detection failure file to the storing unit 23 when each difference value is not less than the predetermined value. When a color of another motherboard 10 needs to be detected, the motherboard 10 is switched off The other motherboard 10 is connected to the detection device 20. A control module 15 of the other motherboard 10 controls a writing module 13 of the other motherboard 10 to delete the detection success file or the detection failure file. The other motherboard 10 is detected by the same principle described above.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A color detection system of a display device comprising:

a motherboard;

a detection device comprising a display unit and a memory unit storing a first color frequency setting value corresponding to a first color, the display unit displays the first color according to the first color frequency setting value; and a detection card mounted on the display unit, and comprising a color sensor and a microcontroller connected to the color sensor, wherein the microcontroller is connected to the motherboard; the color sensor generates a first color frequency current value after sensing the first color from the display unit and sends the first color frequency current value to the microcontroller; the microcontroller sends the first color frequency current value to the motherboard and the motherboard outputs detection success information to the display unit when a first difference value between the first color frequency current value and the first color frequency setting value is less than a predetermined value; the display unit displays the detection success information.

2. The color detection system of claim 1, wherein the memory unit stores a second color frequency setting value corresponding to a second color; the color sensor generates a second color frequency current value after sensing the second color from the display unit and sends the second color frequency current value to the microcontroller; the microcontroller sends the second color frequency current value to the motherboard; the motherboard outputs the detection success information to the display unit when a second difference value between the second color frequency current value and the second color frequency setting value is less than the predetermined value.

3. The color detection system of claim 2, wherein the memory unit stores a third color frequency setting value corresponding to a third color; the color sensor generates a third color frequency current value after sensing the third color from the display unit and sends the third color frequency current value to the microcontroller; the microcontroller sends the third color frequency current value to the motherboard; the motherboard outputs the detection success information to the display unit when a third difference value between the third color frequency current value and the third color frequency setting value is less than the predetermined value.

4. The color detection system of claim 3, wherein the first color is red, the second color is green, and the third color is blue.

5. The color detection system of claim 1, wherein the motherboard comprises a writing module, and a reading module for reading the difference value and the predetermined value; the writing module outputs the detection success information to the display unit and outputs the detection success file to the storing unit when the first difference value is less than the predetermined value.

6. The color detection system of claim 5, wherein the motherboard further comprises a control module; the control module stores the predetermined value and controls the writing module to output the detection success information to the display unit and output the detection success file to the storing unit when the first difference value is less than the predetermined value.

7. The color detection system of claim 1, wherein the detection card further comprises a connector mounted on the microcontroller; the connector is connected to the microcontroller and the motherboard therebetween.

8. The color detection system of claim 1, wherein the detection card further comprises a mounting board; the microcontroller is mounted on the mounting board, and located between the mounting board and the color sensor.

9. The color detection system of claim 8, wherein the mounting board is substantially parallel to the display unit.

10. The color detection system of claim 1, wherein the style of the color sensor is TCS3210D.

11. A color detection system of a display device comprising:

a motherboard;

a detection device comprising a display unit and a memory unit storing a first color frequency setting value corresponding to a first color; and a detection card mounted on the display unit and comprising a color sensor, a microcontroller connected to the color sensor, and a first connector connected to the microcontroller and the motherboard therebetween;

wherein the display unit displays the first color according to the first color frequency setting value; the first connector is mounted on the microcontroller; the color sensor generates a first color frequency current value after sensing the first color from the display unit, and sends the first color frequency current value to the microcontroller; the microcontroller sends the first color frequency current value to the motherboard and the motherboard outputs detection success information to the display unit when a first difference value between the first color frequency current value and the first color frequency setting value is less than a predetermined value; the display unit displays the detection success information.

12. The color detection system of claim 11, wherein the memory unit stores a second color frequency setting value corresponding to a second color; the color sensor generates a second color frequency current value after sensing the second color from the display unit, and sends the second color frequency current value to the microcontroller; the microcontroller sends the second color frequency current value to the motherboard, and the motherboard outputs the detection success information to the display unit when a first difference value between the second color frequency current value and the second color frequency setting value is less than the predetermined value.

13. The color detection system of claim 12, wherein the memory unit stores a third color frequency setting value corresponding to a third color; the color sensor generates a third color frequency current value after sensing the third color from the display unit and sends the third color frequency current value to the microcontroller; the microcontroller sends the third color frequency current value to the motherboard and the motherboard outputs the detection success information to the display unit when a third difference value between the third color frequency current value and the third color frequency setting value is less than the predetermined value.

14. The color detection system of claim 13, wherein the first color is red, the second color is green, and the third color is blue.

15. The color detection system of claim 11, wherein the motherboard comprises a writing module, a control module, and a reading module for reading the first difference value and the predetermined value; the control module stores the predetermined value, and controls the writing module to output the detection success information to the display unit and to output the detection success file to the storing unit when the first difference value is less than the predetermined value.

16. The color detection system of claim 11, wherein the detection card further comprises a second connector connected the motherboard; the microcontroller is coupled to the motherboard via the first connector and the second connector.

17. The color detection system of claim 16, wherein the style of the microcontroller is W79E227.

18. The color detection system of claim 17, wherein the microcontroller comprises a serial communication output terminal and a transmission terminal; the transmission terminal of the microcontroller is connected to the first connector; the serial communication output terminal of the microcontroller is connected to the second connector.

19. The color detection system of claim 11, wherein the detection card further comprises a mounting board; the microcontroller is mounted on the mounting board, and located between the mounting board and the color sensor.

20. The color detection system of claim 19, wherein the mounting board is substantially parallel to the display unit.

* * * * *